United States Patent
Kawano et al.

(10) Patent No.: US 10,487,680 B2
(45) Date of Patent: Nov. 26, 2019

(54) TURBO ROTATION SENSOR AND TURBOCHARGER

(71) Applicant: Hitachi Metals, Ltd., Tokyo (JP)

(72) Inventors: Kei Kawano, Tokyo (JP); Takashi Onimoto, Tokyo (JP); Yuta Sugiyama, Tokyo (JP)

(73) Assignee: HITACHI METALS, LTD., Tokyo (JP)

(*) Notice: Subject to any disclaimer, the term of this patent is extended or adjusted under 35 U.S.C. 154(b) by 95 days.

(21) Appl. No.: 15/819,380

(22) Filed: Nov. 21, 2017

(65) Prior Publication Data
US 2018/0230846 A1 Aug. 16, 2018

(30) Foreign Application Priority Data
Feb. 10, 2017 (JP) .................. 2017-022842

(51) Int. Cl.
| | |
|---|---|
| *F01D 17/06* | (2006.01) |
| *G01P 3/44* | (2006.01) |
| *F02B 39/00* | (2006.01) |
| *G01P 3/487* | (2006.01) |
| *G01P 3/48* | (2006.01) |

(52) U.S. Cl.
CPC .............. *F01D 17/06* (2013.01); *F02B 39/00* (2013.01); *G01P 3/44* (2013.01); *G01P 3/487* (2013.01); *F05D 2220/40* (2013.01); *G01P 3/4802* (2013.01); *Y02T 10/144* (2013.01)

(58) Field of Classification Search
CPC ....... G01P 3/44–4956; F02B 37/00–24; Y02T 10/144
See application file for complete search history.

(56) References Cited

U.S. PATENT DOCUMENTS

| | | | | |
|---|---|---|---|---|
| 4,833,405 A | * | 5/1989 | Richards ................. | G01B 7/02 324/207.16 |
| 4,931,727 A | * | 6/1990 | Yamanoue .............. | B60T 8/172 188/181 R |

(Continued)

FOREIGN PATENT DOCUMENTS

| | | | | |
|---|---|---|---|---|
| DE | 3834994 A1 | * | 4/1990 | ............. F01D 17/06 |
| DE | 19941860 A1 | * | 3/2001 | ............. G01D 5/147 |

(Continued)

*Primary Examiner* — Laert Dounis
(74) *Attorney, Agent, or Firm* — Roberts Mlotkowski Safran Cole & Calderon P.C.

(57) ABSTRACT

A turbo rotation sensor includes a magnet magnetized with two different magnetic poles along a circumferential direction about a rotating shaft of a compressor wheel and provided at an end portion of the compressor wheel on the air intake side, and a sensor portion that is housed in a sensor hole formed on the housing, is arranged to face the magnet in a radial direction of the rotating shaft, and includes two magnetic field detecting elements capable of measuring variation in magnetic flux density caused by the magnet. The two magnetic field detecting elements are aligned in a direction parallel to the rotating shaft so that the respective detection axes are parallel to an axial direction of the rotating shaft. The rotational speed of the compressor wheel is detected based on a difference between the magnetic field strengths detected by the two magnetic field detecting elements.

11 Claims, 9 Drawing Sheets

(56) References Cited

U.S. PATENT DOCUMENTS

| | | | | |
|---|---|---|---|---|
| 5,241,267 A | * | 8/1993 | Gleixner | G01P 3/487 324/174 |
| 5,341,097 A | * | 8/1994 | Wu | G01B 7/14 324/207.12 |
| 6,771,000 B2 | * | 8/2004 | Kim | F01D 15/10 310/156.16 |
| 2003/0052667 A1 | * | 3/2003 | Schwabe | G01D 5/145 324/174 |
| 2007/0186551 A1 | * | 8/2007 | Ante | F01D 17/06 60/605.1 |
| 2007/0268014 A1 | * | 11/2007 | Shimomura | F02B 39/16 324/207.16 |
| 2009/0256552 A1 | * | 10/2009 | Guo | G01B 7/30 324/207.21 |
| 2010/0175375 A1 | * | 7/2010 | Gilch | F01D 17/10 60/602 |
| 2014/0232379 A1 | * | 8/2014 | Nazarian | G01D 5/147 324/207.21 |
| 2017/0322233 A1 | * | 11/2017 | Grambichler | G01D 5/16 |
| 2018/0080801 A1 | * | 3/2018 | Akiyama | F02B 39/16 |

FOREIGN PATENT DOCUMENTS

| | | | | |
|---|---|---|---|---|
| JP | 2008-506074 A | | 2/2008 | |
| JP | 2017044140 A | * | 3/2017 | |
| JP | 2017090191 A | * | 5/2017 | |
| JP | 2017133968 A | * | 8/2017 | |
| WO | WO-2017213004 A1 | * | 12/2017 | ............ G01P 1/00 |

* cited by examiner

MAGNETIZATION DIRECTION

TURBO ROTATION SENSOR AND TURBOCHARGER

The present application is based on Japanese patent application No. 2017-022842 filed on Feb. 10, 2017, the entire contents of which are incorporated herein by reference.

BACKGROUND OF THE INVENTION

1. Field of the Invention

The invention relates to a turbo rotation sensor and a turbocharger using the turbo rotation sensor.

2. Description of the Related Art

A turbo rotation sensor is known which detects a rotational speed of a turbocharger mounted on a vehicle. The turbo rotation sensor is provided with a magnet integrally rotating with a compressor wheel and a magnetic field detecting element to detect a variation in magnetic field caused by the magnet to measure a rotational speed (the number of rotations) of the turbocharger (see e.g. JP 2008/506074A).

SUMMARY OF THE INVENTION

In the turbo rotation sensor using a magnet and a magnetic field detecting element, an external magnetic field may be picked up by the magnetic field detecting element and induce noise, and it may thus fail to accurately detect a rotational speed of the turbocharger. Thus, desired is a turbo rotation sensor which is less likely to be affected by external noise.

Also, if a sensor portion mounting the magnetic field detecting element etc. is arranged to protrude in an air intake path, the air intake may be obstructed so as to degrade the performance of the turbocharger, or the air intake pressure may adversely affect the sensor portion. It is thus desirable that the magnetic field detecting element do not protrude in the air intake path, but if arranged without protruding, a distance between the magnetic field detecting element and the magnet is increased, which may cause a decrease in detection accuracy. Thus, a turbo rotation sensor is desired that can accurately detect a rotational speed of turbocharger even if a distance between the magnet and the magnetic field detecting element is relatively large.

It is an object of the invention to provide a turbo rotation sensor that is less likely to be affected by external noise and that can accurately detect a rotational speed of turbocharger even if a distance between a magnet and a magnetic field detecting element is large, as well as a turbocharger using the turbo rotation sensor.

According to an embodiment of the invention, a turbo rotation sensor for being mounted on a turbocharger to detect a rotational speed of a compressor wheel, the turbocharger comprising a turbine provided on an exhaust gas path of a vehicle internal combustion engine and comprising a turbine wheel rotationally driven by exhaust gas from the internal combustion engine and a compressor provided on an air intake path of the internal combustion engine and comprising the compressor wheel rotationally driven by rotation of the turbine wheel and a housing for housing the compressor wheel, comprises:

a magnet magnetized with two different magnetic poles along a circumferential direction about a rotating shaft of the compressor wheel and provided at an end portion of the compressor wheel on the air intake side so as to rotate together with the compressor wheel; and a sensor portion that is housed in a sensor hole formed on the housing, is arranged to face the magnet in a radial direction of the rotating shaft, and comprises two magnetic field detecting elements capable of measuring variation in magnetic flux density caused by the magnet, wherein the two magnetic field detecting elements are aligned in a direction parallel to the rotating shaft so that the respective detection axes are parallel to an axial direction of the rotating shaft, and wherein the rotational speed of the compressor wheel is detected based on a difference between the magnetic field strengths detected by the two magnetic field detecting elements.

According to another embodiment of the invention, a turbocharger comprises:

a turbine provided on an exhaust gas path of a vehicle internal combustion engine and comprising a turbine wheel rotationally driven by exhaust gas from the internal combustion engine;

a compressor provided on an air intake path of the internal combustion engine and comprising a compressor wheel rotationally driven by rotation of the turbine wheel and a housing for housing the compressor wheel; and a turbo rotation sensor mounted on the turbocharger to detect a rotational speed of the compressor wheel, wherein the turbo rotation sensor comprises:

a magnet magnetized with two different magnetic poles along a circumferential direction about a rotating shaft of the compressor wheel and provided at an end portion of the compressor wheel on the air intake side so as to rotate together with the compressor wheel; and a sensor portion that is housed in a sensor hole formed on the housing, is arranged to face the magnet in a radial direction of the rotating shaft, and comprises two magnetic field detecting elements capable of measuring variation in magnetic flux density caused by the magnet, wherein the two magnetic field detecting elements are aligned in a direction parallel to the rotating shaft so that the respective detection axes are parallel to an axial direction of the rotating shaft, and wherein the rotational speed of the compressor wheel is detected based on a difference between the magnetic field strengths detected by the two magnetic field detecting elements.

Effects of the Invention

According to an embodiment of the invention, a turbo rotation sensor can be provided that is less likely to be affected by external noise and that can accurately detect a rotational speed of turbocharger even if a distance between a magnet and a magnetic field detecting element is large, as well as a turbocharger using the turbo rotation sensor.

BRIEF DESCRIPTION OF THE DRAWINGS

Next, the present invention will be explained in more detail in conjunction with appended drawings, wherein:

FIGS. 3A to 3C are diagrams illustrating a magnet, wherein FIG. 3A is a perspective view, FIG. 3B is a plan view and FIG. 3C is a side view;

DETAILED DESCRIPTION OF THE PREFERRED EMBODIMENTS

Embodiment

An embodiment of the invention will be described below in conjunction with the drawings.

Description of Turbocharger

Figure 1:
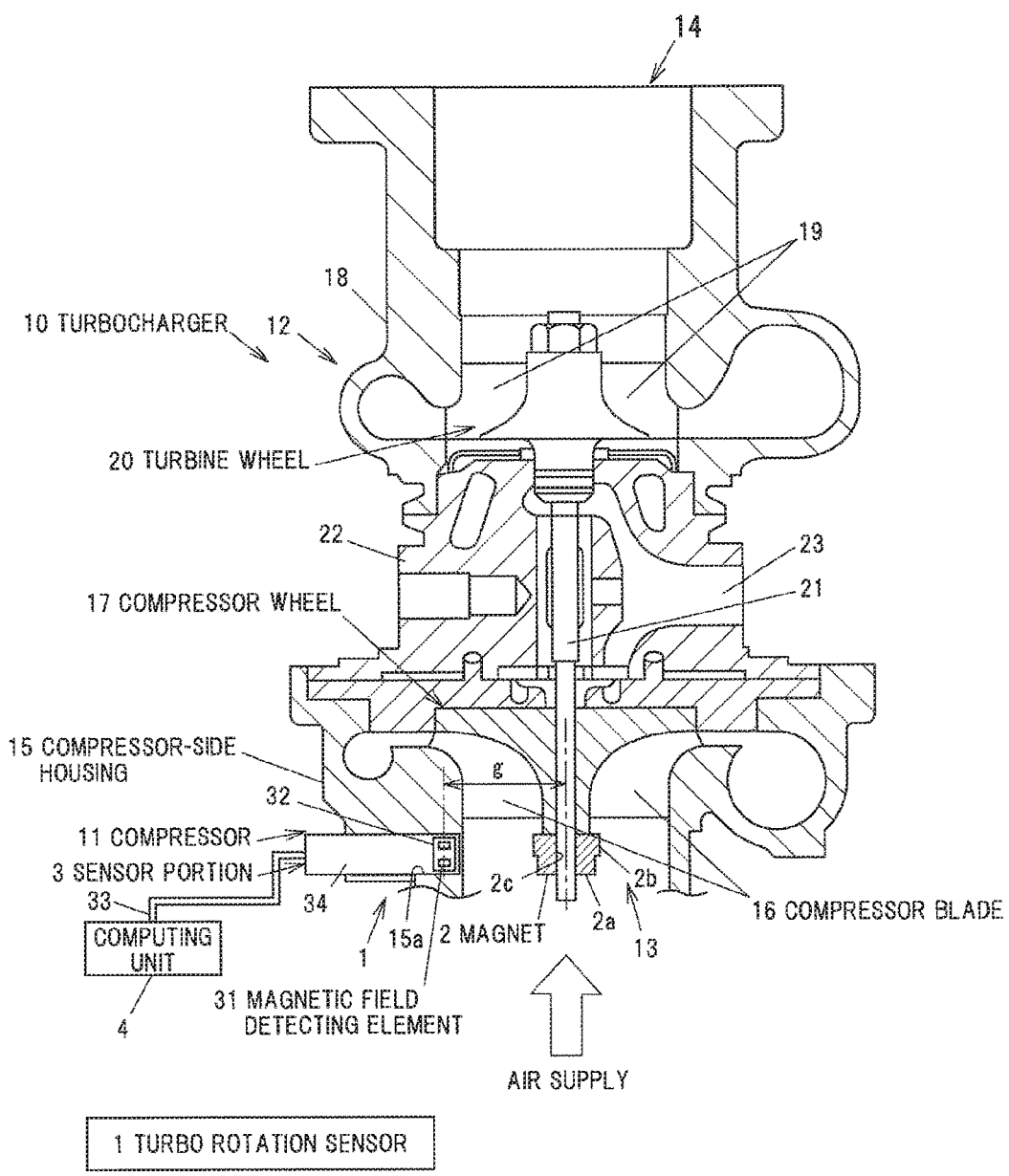
FIG. 1 is a schematic configuration diagram illustrating a turbocharger mounting a turbo rotation sensor in an embodiment of the present invention.

FIG. 1 is a schematic configuration diagram illustrating a turbocharger mounting a turbo rotation sensor in the present embodiment.

As shown in FIG. 1, a turbocharger 10 has a compressor 11 provided on an air intake path 13 of a vehicle internal combustion engine (not shown), and a turbine 12 provided on an exhaust gas path 14 of the internal combustion engine.

The compressor 11 is composed of a compressor wheel 17 having plural compressor blades 16 and a compressor-side housing 15 housing the compressor wheel 17. Meanwhile, the turbine 12 is composed of a turbine wheel 20 having plural turbine blades 19, and a turbine-side housing 18 housing the turbine wheel 20. The turbine 12 is configured that the turbine blades 19 receive exhaust gas from the internal combustion engine and the turbine wheel 20 thereby spins.

The compressor wheel 17 and the turbine wheel 20 are connected by a turbocharger shaft 21, and the compressor wheel 17 is rotationally driven by rotation of the turbine wheel 20. Thus, in the turbocharger 10, the compressor wheel 17 rotates with rotation of the turbine wheel 20 which is rotationally driven by the exhaust gas from the internal combustion engine, and the intake air is thereby compressed and sent to the internal combustion engine.

The turbocharger shaft 21 is rotatably supported by a bearing housing 22 which couples between the compressor-side housing 15 and the turbine-side housing 18. An oil passage 23, through which a lubricating oil for lubricating and cooling the turbocharger shaft 21 is supplied, is formed in the bearing housing 22, and the cooling effect of the lubricating oil supplied through the oil passage 23 prevents heat on the turbine 12 side from transferring to the compressor 11 side.

In the present embodiment, the compressor-side housing 15 and the compressor wheel 17 including the compressor blades 16 are formed of aluminum (or an aluminum alloy). Alternatively, the compressor wheel 17 may be formed of a non-magnetic material such as resin.

Figure 2:
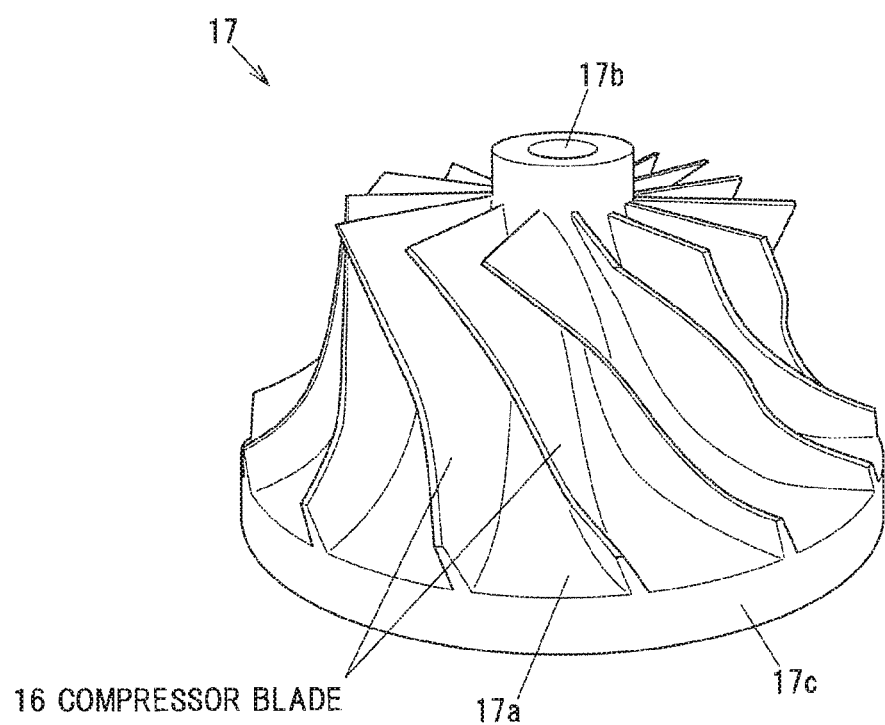
FIG. 2 is a perspective view showing a compressor wheel.

As shown in FIG. 2A, the compressor wheel 17 is configured that a base 17a has a side surface curved so that a diameter gradually enlarges from the top end (the air inlet side, the upper side of the drawing) toward the base end (the turbine side, the lower side of the drawing) and the plural compressor blades 16 are integrally formed on the side surface of the base 17a so as to be inclined with respect to the axial direction. A through-hole 17b, through which the turbocharger shaft 21 is inserted and coupled, is formed at the center of the base 17a. The base 17a has a substantially disc-shaped base end portion 17c which extends on the base end side (the turbine side) with respect to the compressor blades 16.

Description of the Turbo Rotation Sensor 1

The turbocharger 10 mounts a turbo rotation sensor 1 which detects a rotational speed of the turbocharger 10, i.e., a rotational speed of the compressor wheel 17.

The turbo rotation sensor 1 is provided with a magnet 2 and a sensor portion 3. The magnet 2 is provided at an end portion of the compressor wheel 17 on the air intake side (an end portion opposite to the turbine 12) so as to rotate together with the compressor wheel 17. The sensor portion 3 has two magnetic field detecting elements 31 which can measure variation in magnetic flux density (magnetic field strength) caused by the magnet 2.

Description of the Magnet 2

Figure 3A:
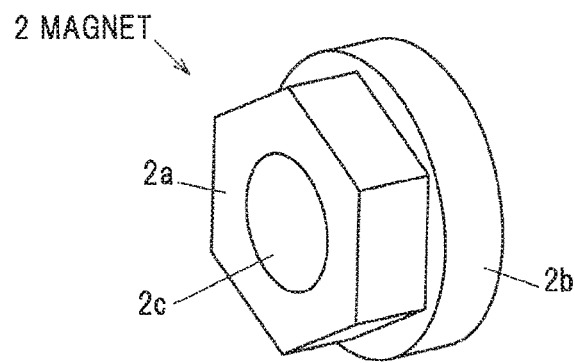
Figure 3B:
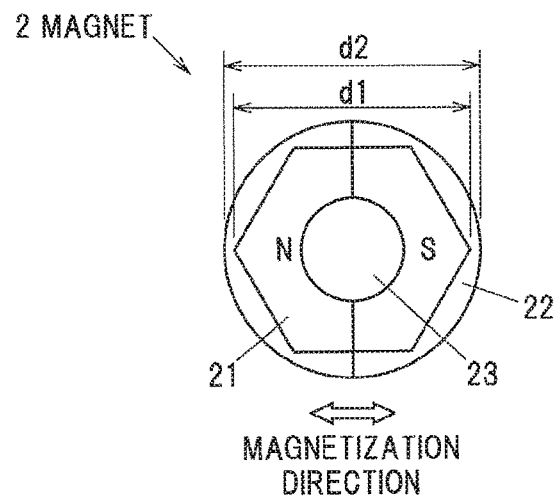
Figure 3C:
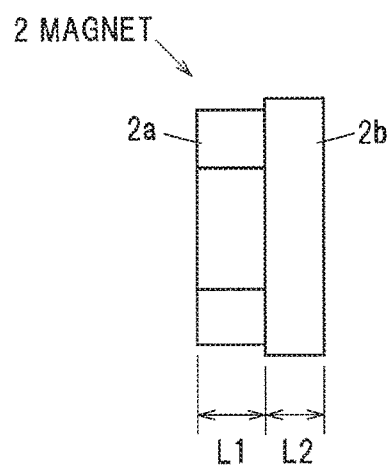

As shown in FIGS. 3A to 3C, the magnet 2 in the present embodiment is formed of a nut which is threaded onto the turbocharger shaft 21 to fix the compressor wheel 17 to the turbocharger shaft 21. In other words, the magnet 2 in the present embodiment is formed by magnetizing the nut which is used to fix the compressor wheel 17.

The magnet 2 is magnetized with two different magnetic poles (an N-pole and an S-pole) along a circumferential direction about a rotating shaft of the compressor wheel 17. The magnetization direction (magnetic polarization direction) of the magnet 2 is along a direction perpendicular to an axial direction of the rotating shaft (i.e., along a radial direction). With this configuration, a magnetic flux can reach a position farther from the magnet 2 in the radial direction and it is thereby possible to improve sensitivity of the turbo rotation sensor 1. It is preferable to use the magnet 2 with a high magnetic force and low demagnetization at high temperature. In the present embodiment, an Fe—Cr—Co magnet (iron-chrome-cobalt magnet) is used as the magnet 2.

In the present embodiment, the magnet 2 has a tool locking portion 2a for locking a fastening tool and a flange portion 2b integrally provided at an axial end of the tool locking portion 2a. A screw hole 2c penetrating the magnet 2 is formed in the center of the magnet 2 when viewed in a cross section perpendicular to the axial direction, hence, the magnet 2 generally has an annular shape. A male screw portion (not shown) having a thread on the outer surface is formed at an end portion of the turbocharger shaft 21, and the magnet 2 is fixed to the turbocharger shaft 21 by threading the male screw portion into the screw hole 2c.

Although an example in which the tool locking portion 2a has a hexagonal shape as viewed from one side in the axial direction (from the air intake side) will be described, the shape of the tool locking portion 2a is not limited thereto. In the present embodiment, the tool locking portion 2a has a maximum outer diameter (a distance between opposite vertices) d1 of 8.1 mm and an axial length L1 of 2.4 mm.

The flange portion 2b is formed in a short columnar shape (short cylindrical shape). An outer diameter d2 of the flange portion 2b is larger than the maximum outer diameter d1 of the tool locking portion 2a. In this example, the flange portion 2b has the outer diameter d2 of 9.0 mm and an axial length L2 of 2.0 mm. The axial length of the entire magnet 2 is 4.4 mm.

Description of the Sensor Portion 3

As shown in FIGS. 1, 4 and 5, the sensor portion 3 is housed in a sensor hole 15a formed on the compressor-side housing 15. In the present embodiment, the sensor hole 15a does not penetrate the housing. Thus, damage on the sensor portion 3 due to air intake pressure, etc., can be prevented and reliability is improved. In this example, a thickness h of the compressor-side housing 15 at a portion between the sensor hole 15a and the air intake path 13 is 1 mm.

A tip portion of the sensor portion 3 is in contact with a bottom surface of the sensor hole 15a which is a portion of the compressor-side housing 15. The sensor portion 3 when housed in the sensor hole 15a is arranged so that the tip portion thereof faces the magnet 2 in the radial direction centered at the rotating shaft of the compressor wheel 17.

Figure 4A:
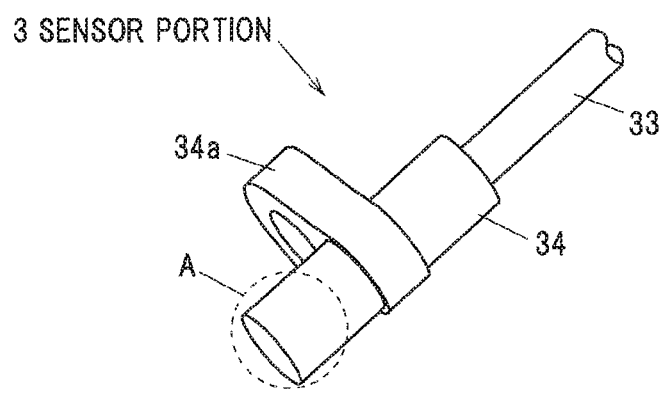
FIG. 4A is a perspective view showing a sensor portion.
Figure 4B:
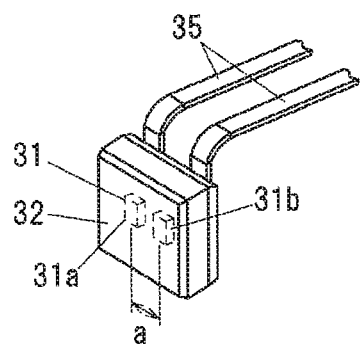
FIG. 4B is a perspective view showing a sensor module.

Two magnetic field detecting elements 31a and 31b are mounted on the tip portion of the sensor portion 3 (a portion indicated by A in FIG. 4A). The two magnetic field detecting elements 31a and 31b are arranged to face the magnet 2 in the radial direction. In other words, the magnet 2 and the magnetic field detecting elements 31a and 31b are provided at the same position in the axial direction of the turbocharger shaft 21 so as to face each other. The arrangement of the magnetic field detecting elements 31a and 31b will be described later.

As the magnetic field detecting elements 31a and 31b, it is possible to use GMR (Giant MagnetoResistive) sensors, Hall elements (Hall ICs), AMR (Anisotropic Magneto-Resistive) sensors, and TMR (Tunneling Magneto-Resistive) sensors, etc. In the present embodiment, GMR sensors are used as the two magnetic field detecting elements 31a and 31b.

In the present embodiment, the sensor portion 3 has a sensor module 32 which incorporates the two magnetic field detecting elements 31a and 31b and outputs an electrical signal corresponding to a difference between the magnetic field strengths detected by the two magnetic field detecting elements 31a and 31b.

The sensor module 32 is covered with a housing 34 formed of a molded resin. In the present embodiment, the housing 34 is formed in a substantially columnar shape. In addition, a fixing flange 34a for fixing the sensor portion 3 to the compressor-side housing 15 is integrally provided on the housing 34. The shape, etc., of the housing 34 is shown only as an example and is not limited to that shown in the drawings.

A signal line 33 for outputting an electrical signal from the sensor module 32 extends from a proximal end of the housing 34. Lead wires 35 for outputting an electrical signal (a signal corresponding to a difference between the magnetic field strengths detected by the two magnetic field detecting elements 31a and 31b) extend from the sensor module 32 and are electrically connected to a core (not shown) of the signal line 33 inside the housing 34 by resistance welding, etc.

A tip portion of the signal line 33 extending from the sensor portion 3 is connected to an ECU (Electronic Control Unit) of vehicle even though it is not shown in the drawing. A computing unit 4 is mounted inside the ECU. The computing unit 4 computes a rotational speed of the compressor wheel 17, i.e., a rotational speed of the turbocharger 10 based on an electrical signal from the sensor portion 3, i.e., an electrical signal corresponding to a difference between the magnetic field strengths detected by the two magnetic field detecting elements 31a and 31b (hereinafter, referred to as "differential magnetic flux density"). The computing unit 4 counts, e.g., the number of times that the electrical signal becomes equal to or exceeds a predetermined threshold voltage (i.e., the number of times that the differential magnetic flux density becomes equal to or exceeds a predetermined threshold), and computes a rotational speed of the turbocharger 10 based on the counted number of times.

Although the example in which the computing unit 4 is mounted on the ECU has been described here, the computing unit 4 may be provided separately from the ECU. For example, the computing unit 4 may be modularized, and in this case, the rotational speed of the turbocharger 10 computed by the computing unit 4 is output to the ECU. Alternatively, the computing unit 4 may be mounted on the sensor portion 3.

Description of Arrangement of the Magnetic Field Detecting Elements 31a and 31b

Figure 5A:
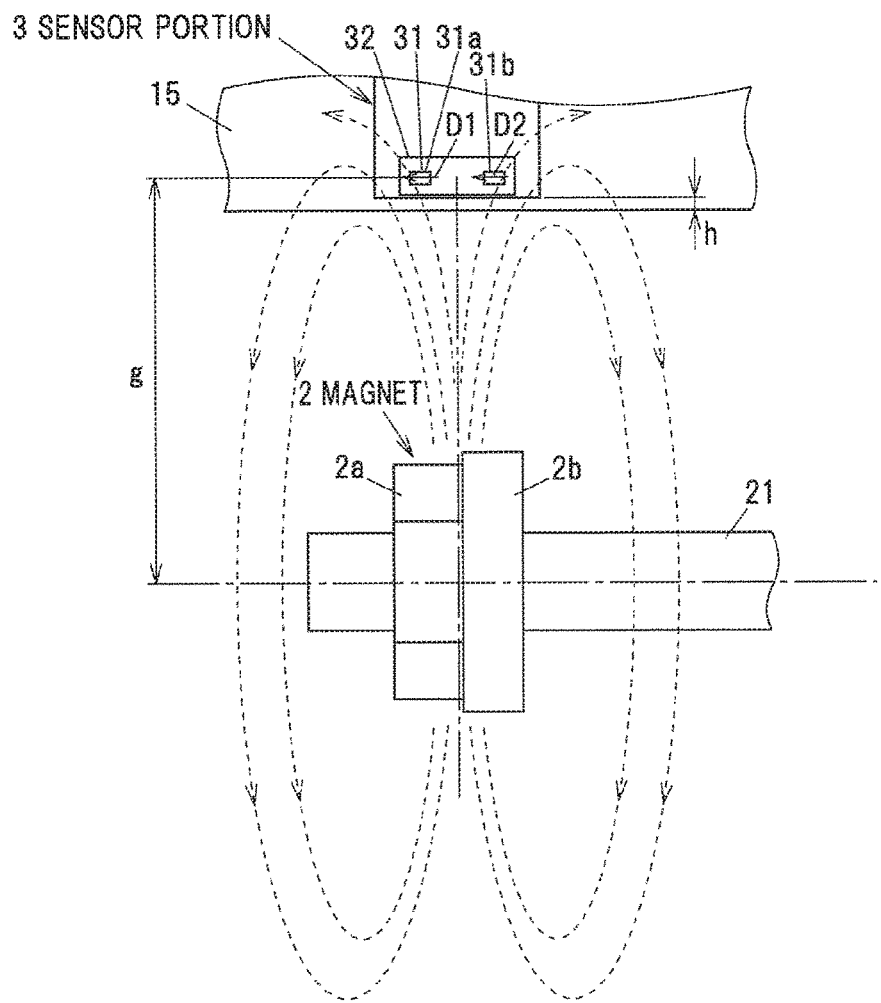
FIGS. 5A and 5B are explanatory diagrams illustrating positions of magnetic field detecting elements and the magnet.
Figure 5B:
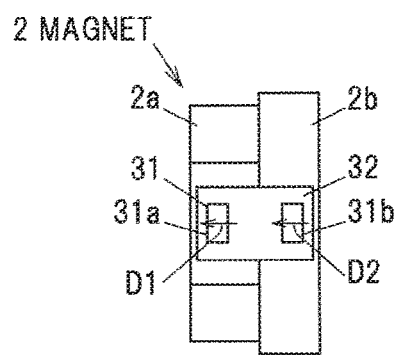

In the turbo rotation sensor 1 of the present embodiment, the two magnetic field detecting elements 31a and 31b are aligned in a direction parallel to the rotating shaft so that respective detection axes D1 and D2 are parallel to the axial direction of the rotating shaft, as shown in FIGS. 5A and 5B.

In addition, in the present embodiment, the magnetic field detecting element 31a (one of the magnetic field detecting elements) is arranged to radially face a portion of the magnet 2 on one axial side (on the air intake side) relative to the axial center of the magnet 2, and the other magnetic field detecting element 31b is arranged to radially face a portion of the magnet 2 on the other axial side (on the turbine 12 side) relative to the axial center of the magnet 2.

In this configuration, a direction of the magnetic flux from the magnet 2 and passing through the magnetic field detecting element 31a is opposite to that through the magnetic field detecting element 31b. Meanwhile, a direction of an external magnetic field detected by the two magnetic field detecting elements 31a and 31b is the same. Therefore, noise induced by an external magnetic field is cancelled out when calculating a difference between the magnetic field strengths detected by the two magnetic field detecting elements 31a and 31b, allowing for more accurate detection of variation in magnetic field strength caused by the magnet 2.

When a space a between the two magnetic field detecting elements 31a and 31b (see FIG. 4B) is too small, a direction of the magnetic field (generated by the magnet 2) detected by the two magnetic field detecting elements 31a and 31b may be the same. Thus, taking into account a distance from the magnet 2 to the magnetic field detecting elements 31a and 31b, etc., the space a between the two magnetic field detecting elements 31a and 31b is appropriately adjusted so that a direction of the magnetic field detected by the two magnetic field detecting elements 31a and 31b is opposite to each other. In the present embodiment, the space a between the two magnetic field detecting elements 31a and 31b is 1.75 mm.

Furthermore, in the present embodiment, the magnetic field detecting element 31a (one of the magnetic field detecting elements) is arranged to radially face the tool locking portion 2a and the other magnetic field detecting element 31b is arranged to radially face the flange portion 2b. When using, e.g., a hexagonal-prism-shaped magnet 2 which does not have the flange portion 2b, magnetic field strength varies not only due to rotation of the magnet 2 but also due to its shape. When using a magnet having the flange portion 2b and arranging the magnetic field detecting element 31b to face the columnar flange portion 2b as is in the present embodiment, it is possible to reduce an influence of variation in magnetic field strength due to the shape of the tool locking portion 2a, allowing a rotational speed of the turbocharger 10 to be detected more accurately. In addition, a distance between the magnet 2 and the magnetic field detecting element 31b is reduced simply because the flange portion 2b has a larger diameter than the tool locking portion 2a, and this improves detection sensitivity.

Both the magnetic field detecting elements 31a and 31b could be arranged to face the flange portion 2b. In this case, however, a size of the magnet 2 needs to be increased so that a direction of the magnetic field detected by the two magnetic field detecting elements 31a and 31b is opposite to each other and a resulting increase in weight may lead to a degradation in performance of the turbocharger 10. That is, by arranging the magnetic field detecting element 31a to face the tool locking portion 2a and the other magnetic field detecting element 31b to face the flange portion 2b as is in the present embodiment, it is possible to improve detection sensitivity while maintaining a small size of the magnet 2.

Figure 6A:
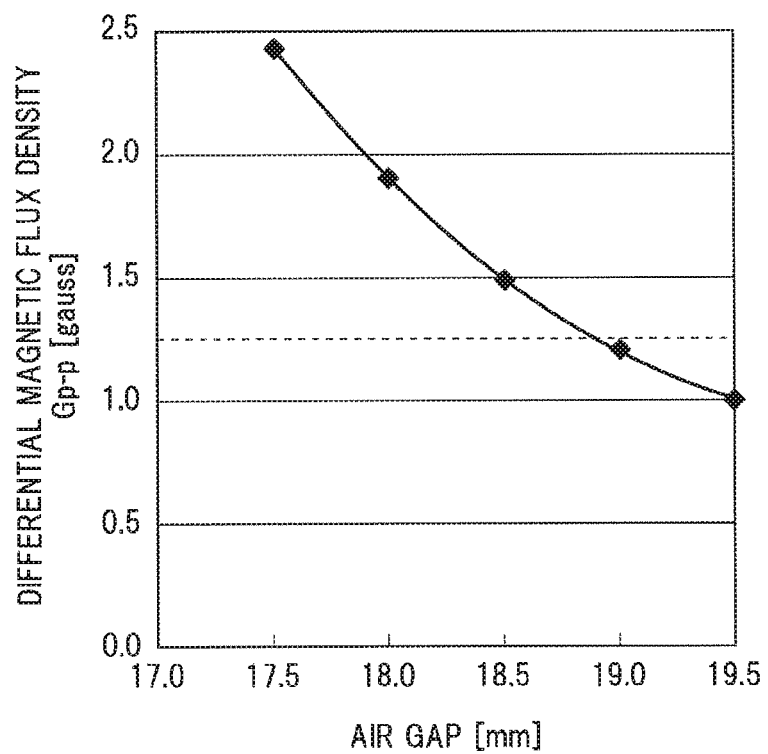
FIG. 6A is a graph showing a relation between air gap and differential magnetic flux density Gp-p obtained in simulation in the invention.
Figure 6B:
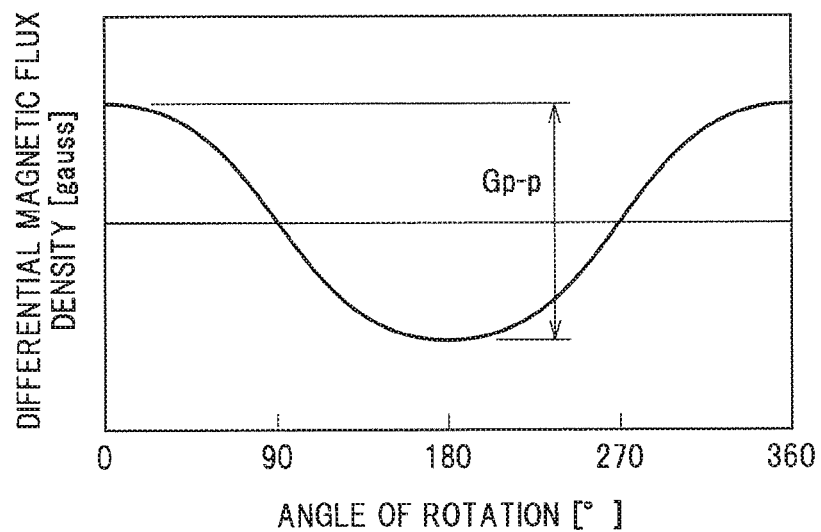
FIG. 6B is an explanatory diagram illustrating the differential magnetic flux density Gp-p.

A relation between air gap g and differential magnetic flux density Gp-p in the turbo rotation sensor 1 of the present embodiment was obtained by simulation. The result is shown in FIG. 6A. The air gap g here is a distance along the radial direction from the rotating shaft of the compressor wheel 17 (the center axis of the magnet 2) to the centers of the magnetic field detecting elements 31a and 31b (detection positions), as shown in FIGS. 1 and 5A. Meanwhile, the differential magnetic flux density Gp-p is a value derived by subtracting the minimum value from the maximum value (a peak-to-peak value) of the differential magnetic flux density during rotation of the magnet 2, as shown in FIG. 6B.

As shown in FIG. 6A, in the present embodiment, the differential magnetic flux density Gp-p detected by the sensor portion 3 is relatively large even when the air gap g is increased, which means that it is possible to accurately detect a rotational speed of the turbocharger 10 even when a distance between the magnet 2 and the magnetic field detecting elements 31 is large. Sensitivity of the general sensor module 32 (a minimum detectable differential magnetic flux density Gp-p) is about 1.25 gauss. Therefore, in the present embodiment, even the general sensor module 32 can be used for a large air gap g of about 18.8 mm. In the present embodiment, sensitivity of the sensor module 32 (a minimum detectable differential magnetic flux density Gp-p) is set to 0.5 gauss to further increase the applicable air gap g. In general, the influence of noise increases when increasing sensitivity of the sensor module 32. However, in the present embodiment, sensitivity of the sensor module 32 can be set to higher since the influence of noise can be reduced by using the differential magnetic flux density.

Figure 7A:
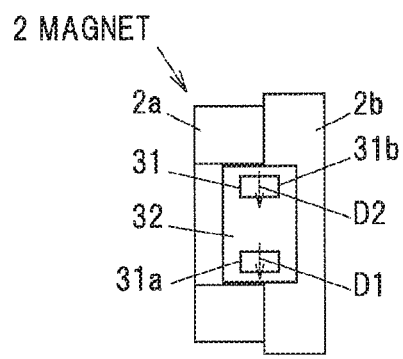
FIG. 7A is an explanatory diagram illustrating positions of the magnetic field detecting elements and the magnet in Comparative Example.
Figure 7B:
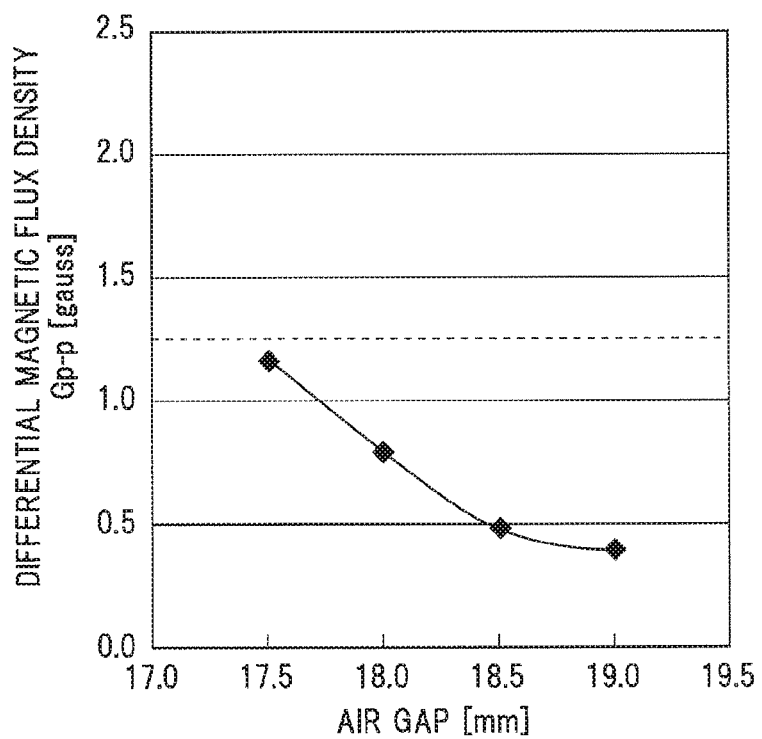
FIG. 7B is a graph showing a relation between air gap and differential magnetic flux density Gp-p obtained in simulation in this Comparative Example.

For the purpose of comparison with the present embodiment, the same simulation was conducted for Comparative Example 1 in which the same sensor module 32 as that used in the present embodiment was used and the direction thereof was rotated 90° so that the two magnetic field detecting elements 31a and 31b were arranged in a direction perpendicular to the axial direction of the rotating shaft (arrange in a tangential direction) as shown in FIG. 7A. The result is shown in FIG. 7B. As understood from comparison between FIG. 7B and FIG. 6A, the differential magnetic flux density Gp-p detected by the sensor portion 3 is larger in the present embodiment than in Comparative example 1.

Figure 8A:
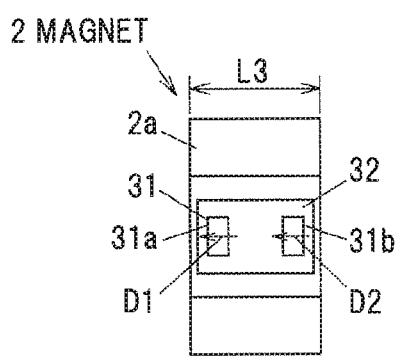
FIG. 8A is an explanatory diagram illustrating positions of the magnetic field detecting elements and the magnet in a modification of the invention.
Figure 8B:
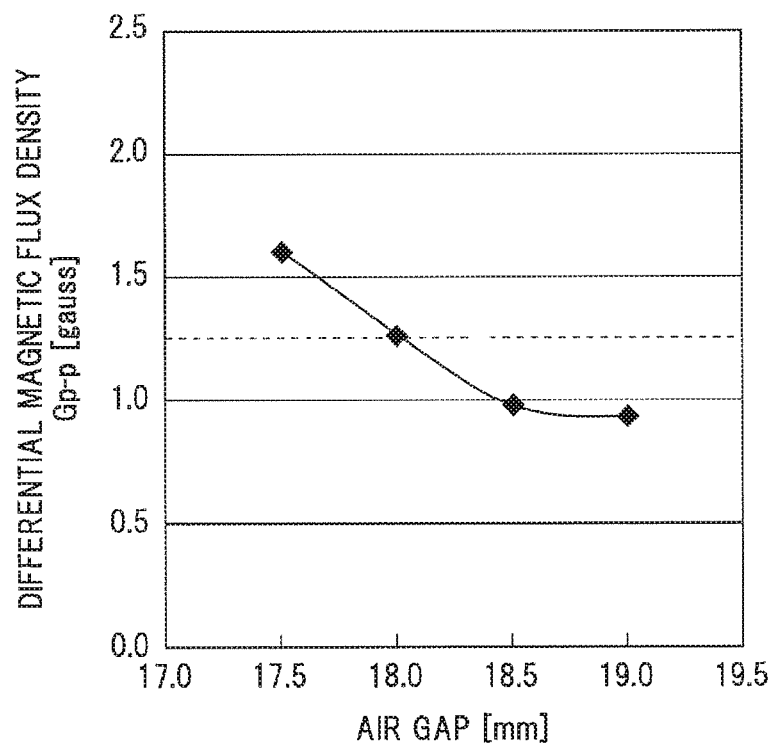
FIG. 8B is a graph showing a relation between air gap and differential magnetic flux density Gp-p obtained in simulation in the modification.

The same simulation was conducted for a modification of the present embodiment in which the magnet 2 not having the flange portion 2b was used, as shown in FIG. 8A. The result is shown in FIG. 8B. The axial length (the thickness) L3 of the magnet 2 was 4.4 mm. As understood from comparison between FIG. 8B and FIG. 6A, the differential magnetic flux density Gp-p detected by the sensor portion 3 and the applicable air gap g are larger in the present embodiment using the flange portion 2b than the modification not having the flange portion 2b.

Figure 9A:
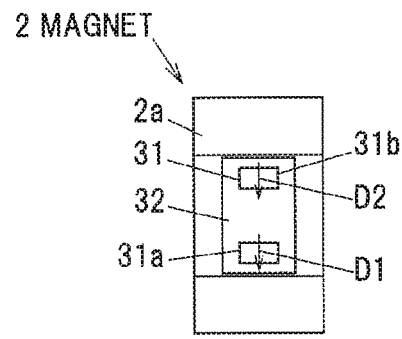
FIG. 9A is an explanatory diagram illustrating positions of the magnetic field detecting elements and the magnet in another Comparative Example.
Figure 9B:
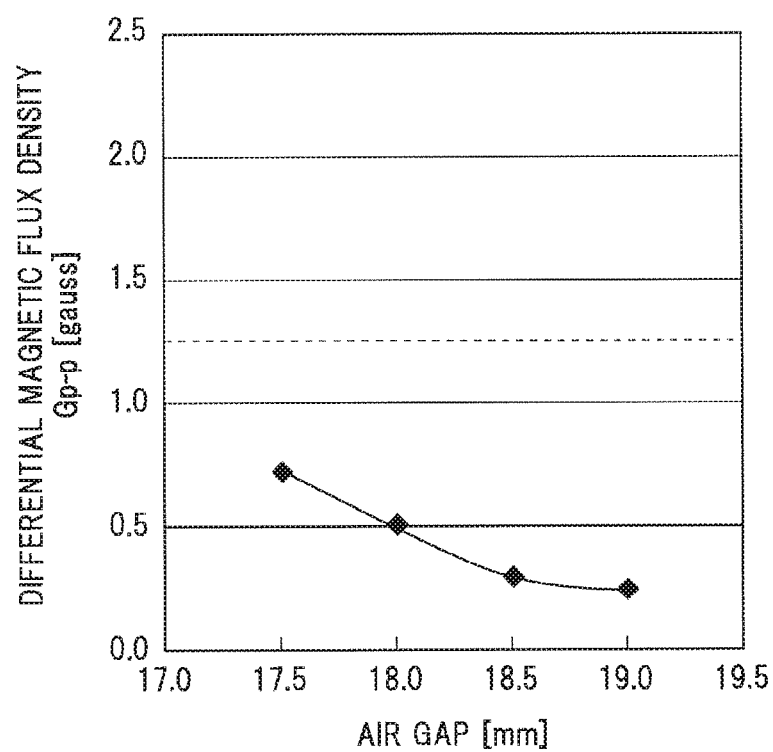
FIG. 9B is a graph showing a relation between air gap and differential magnetic flux density Gp-p obtained in simulation in this Comparative Example.

Furthermore, the same simulation was conducted for Comparative Example 2 in which the magnet 2 not having the flange portion 2b was used and the two magnetic field detecting elements 31a and 31b were arranged in a direction perpendicular to the axial direction of the rotating shaft (arrange in a tangential direction) as shown in FIG. 9A. The result is shown in FIG. 9B. In Comparative Example 2, the differential magnetic flux density Gp-p detected by the sensor portion 3 was very small since the flange portion 2b was not provided and also the magnetic field detecting elements 31a and 31b were not aligned in the axial direction, as shown in FIG. 9A.

Furthermore, the magnet 2 was actually attached to a shaft mimicking the turbocharger shaft 21 and the air gap g at the detection limit in the present embodiment (the present invention) and Comparative Example 1 was obtained from the experiment. The experiment was conducted at a rotating speed of the shaft of 210,000 rpm, using the sensor module 32 having a sensitivity (a minimum detectable differential magnetic flux density Gp-p) of 1.25 and 0.5 gauss. The experimental result is summarized in Table 1.

TABLE 1

|  | Invention | | Comparative Example 1 | |
| --- | --- | --- | --- | --- |
| Sensitivity (Gp-p) [gauss] | 0.5 | 1.25 | 0.5 | 1.25 |
| Air gap [mm] at Detection limit | 21.3 | 19.9 | 19.3 | 17.7 |

As shown in Table 1, the air gap g at the detection limit in the invention is about 2 mm larger than that in Comparative Example 1 with each sensitivity of the sensor module 32, which shows that the invention is applicable to a larger air gap g.

Functions and Effects of the Embodiment

As described above, the turbo rotation sensor 1 in the present embodiment is configured that the two magnetic field detecting elements 31a and 31b mounted on the sensor portion 3 are aligned in a direction parallel to the rotating shaft so that the detection axes D1 and D2 thereof are both parallel to the axial direction of the rotating shaft of the compressor wheel 17 and a rotational speed of the compressor wheel 17 is detected based on a difference between the magnetic field strengths detected by the two magnetic field detecting elements 31a and 31b.

Thus, it is less likely to be affected by external noise. In addition, even when a distance (air gap g) between the magnet 2 and the magnetic field detecting elements 31 is large, it is possible to detect a rotational speed of the turbocharger 10 more accurately by increasing the differential magnetic flux density to be detected, as compared to when the magnetic field detecting elements 31 are aligned in a direction perpendicular to the axial direction as is in Comparative Example 1.

In addition, since the magnetic field detecting element 31a is arranged to face a portion of the magnet 2 on one axial side relative to the axial center of the magnet 2 and the other magnetic field detecting element 31b is arranged to face a portion of the magnet 2 on the other axial side relative to the center, the direction of the magnetic field detected by the two magnetic field detecting elements 31a and 31b can be opposite to each other, which increases the differential magnetic flux density to be detected and thus allows a rotational speed of the turbocharger 10 to be detected more accurately.

Furthermore, by using the magnet 2 having the tool locking portion 2a and the flange portion 2b and arranging the magnetic field detecting element 31a to face the tool locking portion 2a and the other magnetic field detecting element 31b to face the flange portion 2b, it is possible to further improve detection sensitivity while, e.g., maintaining a small size of the magnet 2.

Furthermore, since the sensor hole 15a for housing the sensor portion 3 does not penetrate the compressor-side housing 15, it is possible to prevent damage on the sensor portion 3 due to air intake pressure and thus possible to improve reliability.

SUMMARY OF THE EMBODIMENTS

Technical ideas understood from the embodiment will be described below citing the reference numerals, etc., used for the embodiment. However, each reference numeral, etc., described below is not intended to limit the constituent elements in the claims to the members, etc., specifically described in the embodiment.

[1] A turbo rotation sensor (1) for being mounted on a turbocharger (10) to detect a rotational speed of a compressor wheel (17) of the turbocharger (10), the turbocharger (10) comprising a turbine (12) provided on an exhaust gas path (14) of a vehicle internal combustion engine and comprising a turbine wheel (20) rotationally driven by exhaust gas from the internal combustion engine and a compressor (11) provided on an air intake path (13) of the internal combustion engine and comprising the compressor wheel (17) rotationally driven by rotation of the turbine wheel (20) and a housing (15) for housing the compressor wheel (17), the turbo rotation sensor (1) comprising: a magnet (2) magnetized with two different magnetic poles along a circumferential direction about a rotating shaft of the compressor wheel (17) and provided at an end portion of the compressor wheel (17) on the air intake side so as to rotate together with the compressor wheel (17); and a sensor portion (3) that is housed in a sensor hole (15a) formed on the housing (15), is arranged to face the magnet (2) in a radial direction of the rotating shaft, and comprises two magnetic field detecting elements (31) capable of measuring variation in magnetic flux density caused by the magnet (2), wherein the two magnetic field detecting elements (31) are aligned in a direction parallel to the rotating shaft so that the respective detection axes (D1, D2) are parallel to an axial direction of the rotating shaft, and wherein the rotational speed of the compressor wheel (17) is detected based on a difference between the magnetic field strengths detected by the two magnetic field detecting elements (31).

[2] The turbo rotation sensor (1) defined by [1], wherein one (31a) of the magnetic field detecting elements is arranged to face, in the radial direction, a portion of the magnet (2) on one axial side relative to the center of the magnet (2) in the axial direction, and wherein an other (31b) of the magnetic field detecting elements is arranged to face, in the radial direction, a portion of the magnet (2) on the other axial side relative to the center of the magnet (2) in the axial direction.

[3] The turbo rotation sensor (1) defined by [1] or [2], wherein the magnet (2) comprises a nut that is threaded onto a turbocharger shaft (21) connecting the compressor wheel (17) to the turbine wheel (20) and fixes the compressor wheel (17) to the turbocharger shaft (21).

[4] The turbo rotation sensor (1) defined by [3], wherein the magnet (2) comprises a tool locking portion (2a) for locking a fastening tool and a flange portion (2b) integrally provided at an axial end of the tool locking portion (2a), wherein one (31a) of the magnetic field detecting elements is arranged to face the tool locking portion (2a) in the radial direction, and an other (31b) of the magnetic field detecting elements is arranged to face the flange portion (2b) in the radial direction.

[5] The turbo rotation sensor (1) defined by any one of [1] to [4], wherein the magnet (2) comprises an Fe—Cr—Co magnet.

[6] The turbo rotation sensor (1) defined by any one of [1] to [5], wherein the sensor portion (3) is housed in the sensor hole (15a) that is formed on the housing (15) without penetrating the housing (15).

[7] The turbo rotation sensor (1) defined by any one of [1] to [6], wherein the sensor portion (3) comprises a sensor module (32) that incorporates the two magnetic field detecting elements (31) and outputs an electrical signal corresponding to a difference between the magnetic field strengths detected by the two magnetic field detecting elements (31).

[8] A turbocharger (10), comprising: a turbine (12) provided on an exhaust gas path (14) of a vehicle internal combustion engine and comprising a turbine wheel (20) rotationally driven by exhaust gas from the internal combustion engine; a compressor (11) provided on an air intake path (13) of the internal combustion engine and comprising a compressor wheel (17) rotationally driven by rotation of the turbine wheel (20) and a housing (15) for housing the compressor wheel (17); and a turbo rotation sensor (1) mounted on the turbocharger (10) to detect a rotational speed of the compressor wheel (17), wherein the turbo rotation sensor (1) comprises: a magnet (2) magnetized with two different magnetic poles along a circumferential direction about a rotating shaft of the compressor wheel (17) and provided at an end portion of the compressor wheel (17) on the air intake side so as to rotate together with the compressor wheel (17); and a sensor portion (3) that is housed in a sensor hole (15a) formed on the housing (15), is arranged to face the magnet (2) in a radial direction of the rotating shaft, and comprises two magnetic field detecting elements (31) capable of measuring variation in magnetic flux density caused by the magnet (2), wherein the two magnetic field detecting elements (31) are aligned in a direction parallel to the rotating shaft so that the respective detection axes (D1, D2) are parallel to an axial direction of the rotating shaft, and wherein the rotational speed of the compressor wheel (17) is detected based on a difference between the magnetic field strengths detected by the two magnetic field detecting elements (17).

Although the embodiment of the invention has been described, the invention according to claims is not to be limited to the embodiment. Further, please note that all combinations of the features described in the embodiment are not necessary to solve the problem of the invention.

The invention can be appropriately modified and implemented without departing from the gist thereof.

For example, although the example of using only one sensor portion 3 has been described in the embodiment, it can be configured to use plural sensor portions 3 and to obtain a rotational speed of the compressor wheel 17 based on the outputs from the plural sensor portions 3. In this case, for example, two sensor portions 3 are provided to radially face each other with the magnet 2 interposed therebetween, and a rotational speed of the compressor wheel 17 is obtained based on a difference between voltages (currents) output from the respective sensor modules 32 of the two sensor portions 3.

Alternatively, a magnetic path forming member such as soft magnetic body may be provided between the sensor portion 3 and the magnet 2 so that a magnetic flux from the magnet 2 is guided to the sensor portion 3, even though it is not mentioned in the embodiment. In this case, since the direction of the magnetic field detected by the two magnetic field detecting elements 31a and 31b can be adjusted to be opposite to each other by the magnetic path forming member, both the magnetic field detecting elements 31a and 31b can be arranged at the axial center position of the magnet 2, or at a position shifted to one side (the air intake side or the turbine 12 side) from the center position.

What is claimed is:

1. A turbo rotation sensor for being mounted on a turbocharger to detect a rotational speed of a compressor wheel, the turbocharger comprising a turbine provided on an exhaust gas path of a vehicle internal combustion engine and comprising a turbine wheel rotationally driven by exhaust gas from the internal combustion engine and a compressor provided on an air intake path of the internal combustion engine and comprising the compressor wheel rotationally driven by rotation of the turbine wheel and a housing for housing the compressor wheel, the turbo rotation sensor comprising:
    a magnet magnetized with two different magnetic poles along a circumferential direction about a rotating shaft of the compressor wheel and provided at an end portion of the compressor wheel on the air intake side so as to rotate together with the compressor wheel, the magnet having a first shape along a first axial side, and a second shape different form the first shape along a second axial side; and
    a sensor assembly that is housed in a sensor hole formed on the housing, is arranged to face the magnet in a radial direction of the rotating shaft, and comprises two magnetic field sensors capable of measuring variation in magnetic flux density caused by the magnet,
    wherein the two magnetic field sensors are serially aligned in a direction parallel to the rotating shaft so that the respective detection axes are parallel to an axial direction of the rotating shaft,
    wherein the rotational speed of the compressor wheel is detected based on a difference between the magnetic field strengths detected by the two magnetic field sensors,
    wherein one of the magnetic field sensors is arranged to face, in the radial direction, the first shape of the magnet on the first axial side in the axial direction, and
    wherein the other of the magnetic field sensors is arranged to face, in the radial direction, the second shape of the magnet on the second axial side in the axial direction.

2. The turbo rotation sensor according to claim 1, wherein the magnet comprises a nut that is threaded onto a turbocharger shaft connecting the compressor wheel to the turbine wheel and fixes the compressor wheel to the turbocharger shaft.

3. The turbo rotation sensor according to claim 2, wherein the magnet comprises a tool locking portion for locking a fastening tool and a flange portion integrally provided at an axial end of the tool locking portion,
    wherein one of the magnetic field sensors is arranged to face the tool locking portion in the radial direction, and
    wherein another of the magnetic field sensors is arranged to face the flange portion in the radial direction.

4. The turbo rotation sensor according to claim 1, wherein the magnet comprises an Fe—Cr—Co magnet.

5. The turbo rotation sensor according to claim 1, wherein the sensor assembly is housed in the sensor hole that is formed on the housing without penetrating the housing.

6. The turbo rotation sensor according to claim 1, wherein the sensor assembly comprises a sensor module that incorporates the two magnetic field sensors and outputs an electrical signal corresponding to a difference between the magnetic field strengths detected by the two magnetic field sensors.

7. The turbo rotation sensor according to claim 1, wherein the magnet is spaced from blades of the compressor wheel in the axial direction.

8. The turbo rotation sensor according to claim 1, wherein the first and second axial sides of the magnet each extend from an axial center of the magnet.

9. The turbo rotation sensor according to claim 1, wherein the first axial side of the magnet is cylindrically-shaped, and the second axial side of the magnet is nut-shaped.

10. A turbocharger, comprising:
    a turbine provided on an exhaust gas path of a vehicle internal combustion engine and comprising a turbine wheel rotationally driven by exhaust gas from the internal combustion engine;
    a compressor provided on an air intake path of the internal combustion engine and comprising a compressor wheel rotationally driven by rotation of the turbine wheel and a housing for housing the compressor wheel; and
    a turbo rotation sensor mounted on the turbocharger to detect a rotational speed of the compressor wheel,
    wherein the turbo rotation sensor comprises:
        a magnet magnetized with two different magnetic poles along a circumferential direction about a rotating shaft of the compressor wheel and provided at an end portion of the compressor wheel on the air intake side so as to rotate together with the compressor wheel; and
        a sensor assembly that is housed in a sensor hole formed on the housing, is arranged to face the magnet in a radial direction of the rotating shaft, and comprises two magnetic field sensors capable of measuring variation in magnetic flux density caused by the magnet,
        wherein the two magnetic field sensors are serially aligned in a direction parallel to the rotating shaft so that the respective detection axes are parallel to an axial direction of the rotating shaft,
        wherein the rotational speed of the compressor wheel is detected based on a difference between the magnetic field strengths detected by the two magnetic field sensors, wherein the magnet has first and second axial sides serially aligned along the rotating shaft, each side of which has a different maximum radial extent, wherein one of the magnetic field sensors is arranged to face, in the radial direction, the first axial side of the magnet in the axial direction, and wherein another of the magnetic field sensors is arranged to face, in the radial direction, the second axial side in the axial direction.

11. The turbo rotation sensor according to claim 10, wherein the first and second axial sides of the magnet each extend from an axial center of the magnet.

* * * * *